(12) United States Patent
Yoneda et al.

(10) Patent No.: US 8,168,100 B2
(45) Date of Patent: May 1, 2012

(54) MOLTEN RESIN SUPPLY METHOD, MOLTEN RESIN SUPPLY DEVICE, MOLTEN RESIN COMPRESSION MOLDING METHOD, MOLTEN RESIN COMPRESSION MOLDING DEVICE, AND SYNTHETIC RESIN CONTAINER MANUFACTURING METHOD

(75) Inventors: Atsushi Yoneda, Yokohama (JP); Yuuji Iwakiri, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 12/736,088

(22) PCT Filed: Mar. 17, 2009

(86) PCT No.: PCT/JP2009/055089
§ 371 (c)(1),
(2), (4) Date: Sep. 9, 2010

(87) PCT Pub. No.: WO2009/116505
PCT Pub. Date: Sep. 24, 2009

(65) Prior Publication Data
US 2011/0001258 A1     Jan. 6, 2011

(30) Foreign Application Priority Data
Mar. 19, 2008   (JP) .................................. 2008-071368

(51) Int. Cl.
*B29C 43/06*   (2006.01)

(52) U.S. Cl. .................. 264/148; 264/297.6; 264/297.7; 264/297.8

(58) Field of Classification Search .................. 264/148, 264/297.7, 297.8; 425/256, 258, 261
See application file for complete search history.

(56) References Cited

U.S. PATENT DOCUMENTS 1,593,525 A * 7/1926 Copeland ...................... 264/320
(Continued)

FOREIGN PATENT DOCUMENTS
EP   1 652 645   5/2006
(Continued)

OTHER PUBLICATIONS

English machine translation of JP 2005-343110, retrieved from JPO database Feb. 2, 2011.*

(Continued)

*Primary Examiner* — Joseph Del Sole
*Assistant Examiner* — Timothy Kennedy
(74) *Attorney, Agent, or Firm* — Manabu Kanesaka

(57) ABSTRACT

Each of supply means 30 arranged around an extrusion port 22 of an extruder 20 supplies, while cutting a molten resin which has been extruded from the extrusion port 22 of the extruder 20 alternately in a predetermined length, the molten resin D which has been cut to a supply position which is provided at each of the supply means, and then sequentially supplies the molten resin D to each of a compression molding dies 40 which are provided in a pair with each of the supply means. As a result, in producing a synthetic resin molded article with a predetermined shape by compression molding by cutting a molten resin which has been extruded from an extruder and supplying the resin which has been cut to a compression molding die, the above-mentioned constitution can be preferably utilized for the production of a synthetic resin molded product which requires a further high load. In addition, by this constitution, not only a molten resin can be supplied to a compression molding die with a sufficient accuracy, but also the positional accuracy of the supplied molten resin is prevented from being impaired after the resin is supplied to the compression molding die.

6 Claims, 9 Drawing Sheets

U.S. PATENT DOCUMENTS

| | | | |
|---|---|---|---|
| 4,755,125 A | | 7/1988 | Takeda et al. |
| 4,913,871 A | * | 4/1990 | Kawaguchi et al. ......... 264/294 |
| 5,811,044 A | * | 9/1998 | Rote et al. ..................... 264/148 |
| 7,425,124 B2 | * | 9/2008 | Zoppas ..................... 264/297.6 |
| 2002/0088767 A1 | | 7/2002 | Saito et al. |
| 2003/0198707 A1 | * | 10/2003 | Battilani ....................... 425/261 |
| 2006/0065992 A1 | * | 3/2006 | Hutchinson et al. ......... 264/320 |
| 2007/0071981 A1 | | 3/2007 | Bergami et al. |
| 2007/0196531 A1 | | 8/2007 | Parrinello et al. |
| 2008/0136058 A1 | * | 6/2008 | Mattice et al. ............. 264/297.6 |
| 2008/0290558 A1 | * | 11/2008 | Steele ....................... 264/297.6 |
| 2009/0014915 A1 | * | 1/2009 | Asano et al. ................ 264/330 |

FOREIGN PATENT DOCUMENTS

| | | |
|---|---|---|
| EP | 1 777 245 | 4/2007 |
| EP | 1 985 430 | 10/2008 |
| JP | 2002-103428 | 4/2002 |
| JP | 2005-343110 | 12/2005 |
| JP | 2007-216531 | 8/2007 |
| WO | WO 2007094518 A1 * | 8/2007 |
| WO | WO 2008/032841 | 3/2008 |

OTHER PUBLICATIONS

JPO English machine translation of JP 2009-226609, retrieved from JPO database Apr. 26, 2011.*

* cited by examiner (a)   (b)

MOLTEN RESIN SUPPLY METHOD, MOLTEN RESIN SUPPLY DEVICE, MOLTEN RESIN COMPRESSION MOLDING METHOD, MOLTEN RESIN COMPRESSION MOLDING DEVICE, AND SYNTHETIC RESIN CONTAINER MANUFACTURING METHOD

RELATED APPLICATIONS

The present application is based on international Application No. PCT/JP2009/055089, filed Mar. 17, 2009, and claims priority from, Japanese Application Number 2008-071368, filed Mar. 19, 2008, the disclosure of which is hereby incorporated by reference herein in its entirety.

TECHNICAL FIELD

The invention relates to a molten resin supply method for supplying a molten resin which has been extruded from an extruder to a compression molding die after cutting it in a predetermined length, a molten resin supply apparatus for preferably carrying out the molten resin supply method, a molten resin compression molding method for compression molding a molten resin which has been supplied to a compression molding die in a predetermined shape by preferably utilizing the molten resin supply method and the molten resin supply apparatus, and a molten resin compression molding apparatus for preferably carrying out the molten resin compression molding method, and a synthetic resin container production method for producing a synthetic resin container preferably utilizing the molten resin compression molding method and the molten resin compression molding apparatus.

BACKGROUND ART

As a technique for mass producing a synthetic resin molded article in a predetermined shape, the applicant previously proposed in Patent Document 1 a compression molding system in which a synthetic resin which has been extruded from an extrusion apparatus is separated at the extrusion port and sequentially supplied to a plurality of compression molding dies which rotate around the synthetic resin supply region, the compression molding and cooling region, the outlet region, whereby a synthetic resin molded article is continuously produced.
Patent Document 1: JP-A-2007-216531

DISCLOSURE OF THE INVENTION

Problems To Be Solved By the Invention

In Patent Document 1, an example is shown in which a plurality of support stands are fixed on the rotation base connected to the source of rotation, and together with a female die and a male die, a molding means equipped with a pressurization mechanism (cylinder mechanism) for imposing a load at the time of compression molding is installed, whereby a plurality of compression molding dies are allowed to rotate around each of the above-mentioned regions. Later, the inventors made improvements on this example, and arrived at the following finding.

For example, the example shown above has a configuration in which all of molding die means, each of which conducts compression molding alone, is allowed to move together with the rotation of the rotation base.

Therefore, in the case where a further higher load is required for compression molding, and an increase in weight of molding die means is inevitable for improving the performance of the pressurization mechanism and ensuring the strength required therefor, the mechanism for rotating the rotation base is required to have a strength sufficient enough to withstand an increase in weight of the molding die means. Therefore, if an attempt is made to meet this requirement, problems may occur that the entire apparatus is increased in size and the production cost of the apparatus is increased.

The compression molding system exemplified in Patent Document 1 is designed mainly for a preform (pre-molded product) which is used for molding by stretch blow molding or the like a synthetic resin container such as a PET bottle, taking into consideration that the preform is produced by compression molding. Such a preform has a relatively large thickness, and a relatively small load is imposed for compression molding. Therefore, the above-mentioned problems are not so serious for the preform.

On the other hand, when an attempt is made to mold the supplied synthetic resin into a synthetic resin container in the form of a thin-wall cup by compression molding, a necessary load may be several tens times larger than the load required for molding the above-mentioned preform. Therefore, if an attempt is made to apply the compression molding system exemplified in Patent Document 1 to the production of a compression molded article which requires a further higher load, actually, it is restricted to a case where the above-mentioned problems are permitted.

According to the compression molding system exemplified in Patent Document 1, a synthetic resin can be supplied satisfactorily accurately to a predetermined position in a molding cavity of the male die. When the molding die means are moved along with the rotation of the rotation base, a centrifugal force is applied to a synthetic resin which has been supplied within the cavity.

For this reason, even if a synthetic resin can be supplied to the predetermined position in the cavity satisfactorily accurately, there is a concern that the position of the resin within the cavity may be shifted by the inclination of the synthetic resin which has been supplied in the cavity by a centrifugal force during a period of time after the supply of the synthetic resin and the mold clamping. When the thin-wall container made of a synthetic resin having a multilayer structure is produced by compression molding (an explanation is given later for details), a significantly high degree of accuracy is required for the position and posture within the cavity of the supplied synthetic resin at the time of compression molding, it is desired that no external force such as a centrifugal force is exerted on the synthetic resin supplied in the cavity.

The invention has been made based on the above-mentioned finding. An object of the invention is to provide a molten resin supply method which, in producing a synthetic resin molded article in a predetermined shape by compression molding by cutting a molten resin which has been extruded from an extruder and supplying the resin which has been cut to a compression molding die, can preferably be used in the production of a synthetic resin molded article which requires a further higher load, and not only can be used for supplying a molten resin to a compression molding die with a sufficient accuracy, but also, after the molten resin is supplied to a compression molding die, the positional accuracy of the supplied resin is not impaired, a molten resin supply apparatus for preferably conducting such molten resin supply method, a molten resin compression molding method which preferably utilizes the molten resin supply method and the molten resin supply apparatus, a molten resin compression molding apparatus for preferably utilizing the molten resin compression molding method, and a synthetic resin container production method which preferably utilizes the molten resin compression molding method and the molten resin compression molding apparatus.

Means For Solving the Problems

The molten resin supply method according to the invention is a method comprising: extruding a resin in the molten state from an extrusion port of an extruder downwardly almost vertically, while cutting the molten resin which has been extruded from the extrusion port alternately in a predetermined length by means of a plurality of supply means provided around the extrusion port, supplying the molten resin to the supply position provided at each of the supply means.

The molten resin supply apparatus according to the invention is a method comprising:

an extruder provided with an extrusion port from which a resin in the molten state is extruded downwardly almost vertically, and a plurality of supply means which each has a cutting part which cuts the molten resin which has been extruded from the extrusion port and supplies the molten resin which has been cut by the cutting part to the supply position provided at each of the supply means, wherein each of the supply means is arranged around the extrusion port and reciprocally moves between the lower position of the extrusion port and the supply position.

The molten resin compression molding method according to the invention is a method comprising:

extruding a resin in the molten state from an extrusion port of an extruder downwardly almost vertically, while cutting the molten resin which has been extruded from the extrusion port alternately in a predetermined length by means of a plurality of supply means provided around the extrusion port;

supplying the molten resin to each of a plurality of compression molding apparatuses provided in a pair with the supporting means, and compressing molding the molten resin which has been cut by the compression molding apparatus in a predetermined shape.

The molten resin compression molding apparatus according to the invention is an apparatus comprising:

an extruder provided with an extrusion port from which a resin in the molten state is extruded downwardly almost vertically, a plurality of supply means which each has a cutting part which cuts the molten resin which has been extruded from the extrusion port and supplies the molten resin which has been cut by the cutting part to a supply position provided at each of the supply means, and a plurality of compression molding dies which provided in a pair with the supply means at the supply position provided at each of the supply means and compression molding the molten resin which has been cut in a predetermined shape, wherein the supply means are arranged around the extrusion port and sequentially supplies the molten resin which has been cut to the compression molding die by moving reciprocally between the lower position of the extrusion port and the supply position.

The synthetic resin container production method of the invention is a method comprising:

extruding from an extrusion port of an extruder a resin in the molten resin downwardly almost vertically, while cutting the molten resin which has been extruded from the extrusion port alternately in a predetermined length by means of a plurality of supply means provided around the extrusion port, supplying the molten resin to each of a plurality of compression molding apparatuses provided in a pair with the supporting means, and compressing molding the molten resin which has been cut by the compression molding apparatus into a predetermined container shape.

Advantageous Effects of the Invention

As mentioned above, in the invention, a compression molding die is provided at the supply position provided for each supply means. Accordingly, no mechanism is necessary for moving the compression molding die. Therefore, even in a case where a higher load for compression molding is needed, and improvement in capability of pressurizing mechanism and ensuring the strength required therefor, no adverse affects are exerted on other parts than the compression molding die. Accordingly, the invention can be used to the production of a synthetic resin molded article which requires a further higher load without causing disadvantages that the entire apparatus is increased in size and the production cost of the apparatus is increased. Further, not only a molten resin can be supplied to a compression molding die with a sufficiently high accuracy, but also, even after a molten resin is supplied to a compression molding die, the positional accuracy of the supplied molten resin is not impaired.

| Explanation of Symbols | |
| --- | --- |
| 10. | Molding apparatus |
| 20. | Extruder |
| 22. | Extrusion port |
| 30. | Supply means |
| 31. | Cutting part |
| 33. | Supporting surface |
| 34. | Supporting member |
| 300. | Driving mechanism |
| 301. | Actuator for horizontal driving |
| 302. | Actuator for vertical driving |
| 40. | Compression molding die |
| 41. | Male die (lower die) |

-continued

| | Explanation of Symbols |
|---|---|
| 411. | Receiving part |
| 42. | Female die (upper die) |
| 50. | Synthetic resin container |

BEST MODE FOR CARRYING OUT THE INVENTION

The preferred embodiment of the invention will be explained hereinbelow with reference to the drawings.

Molten Resin Compression Molding Apparatus

At first, an embodiment of a molten resin compression molding apparatus of the invention will be explained.

Figure 1:
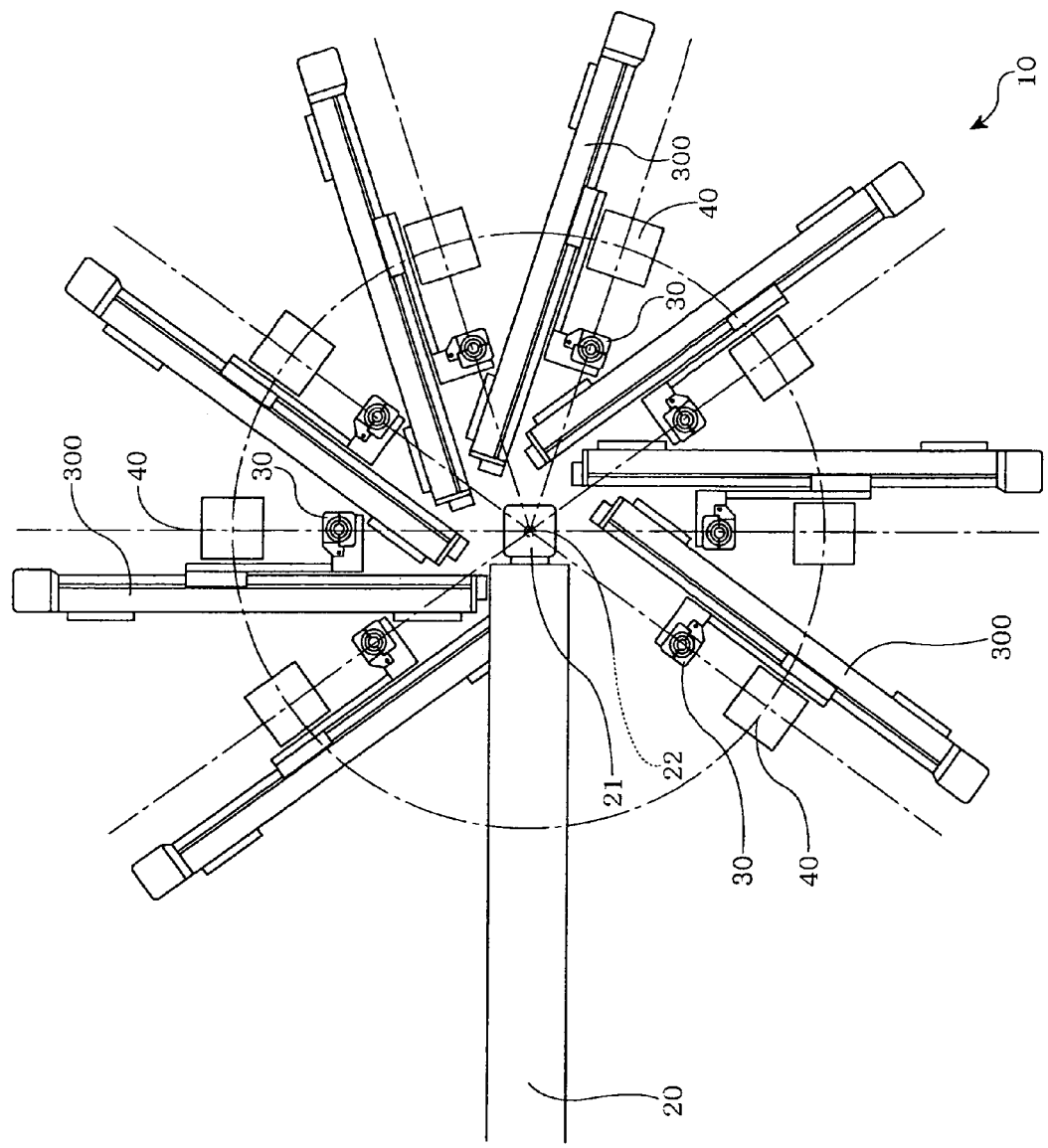
FIG. 1 is a schematic plan view showing the embodiment of a molten resin compression molding apparatus according to the invention.
Figure 2:
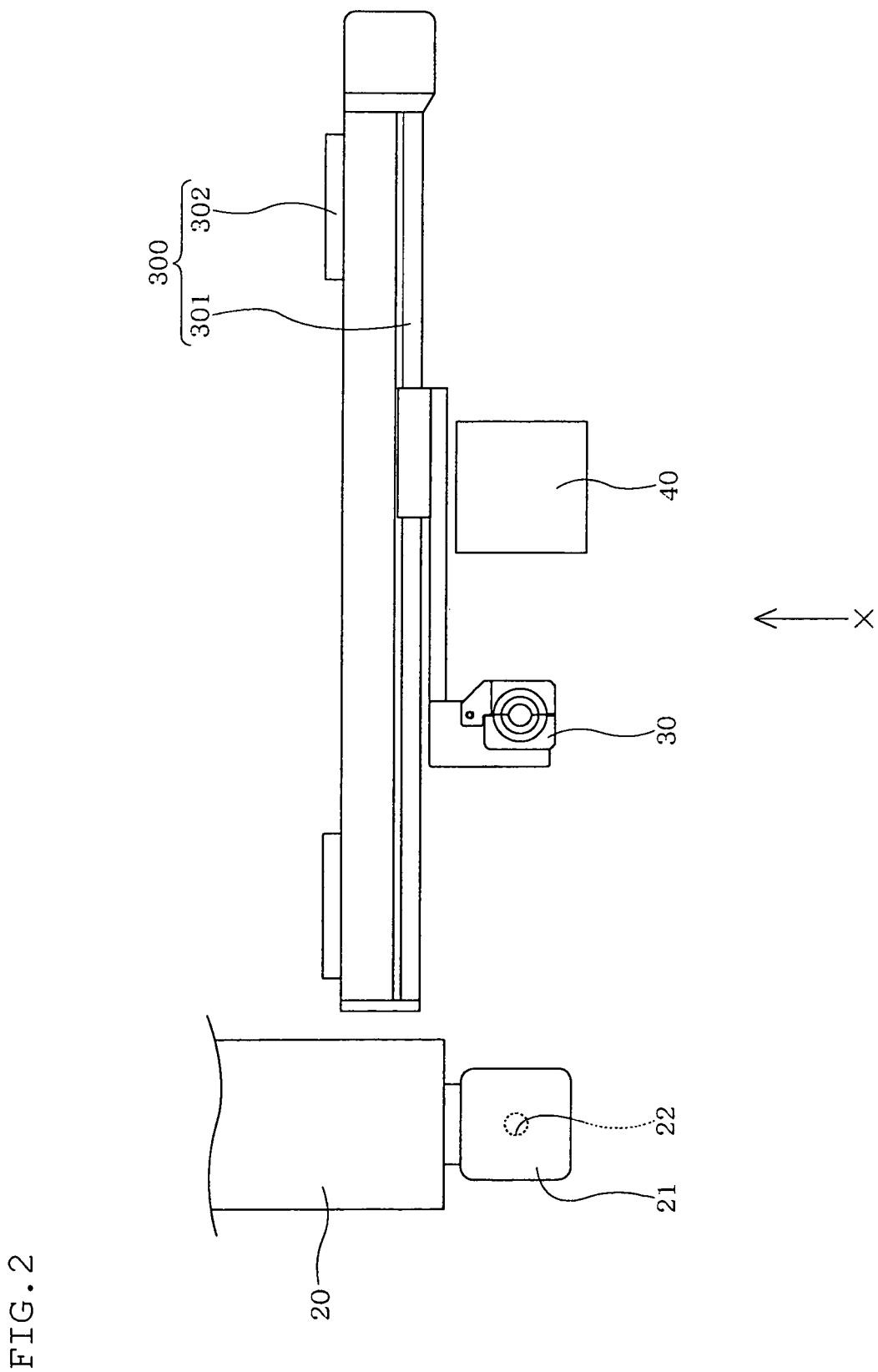
FIG. 2 is an enlarged view of the essential parts showing an embodiment of a molten resin compression molding apparatus according to the invention.
Figure 3:
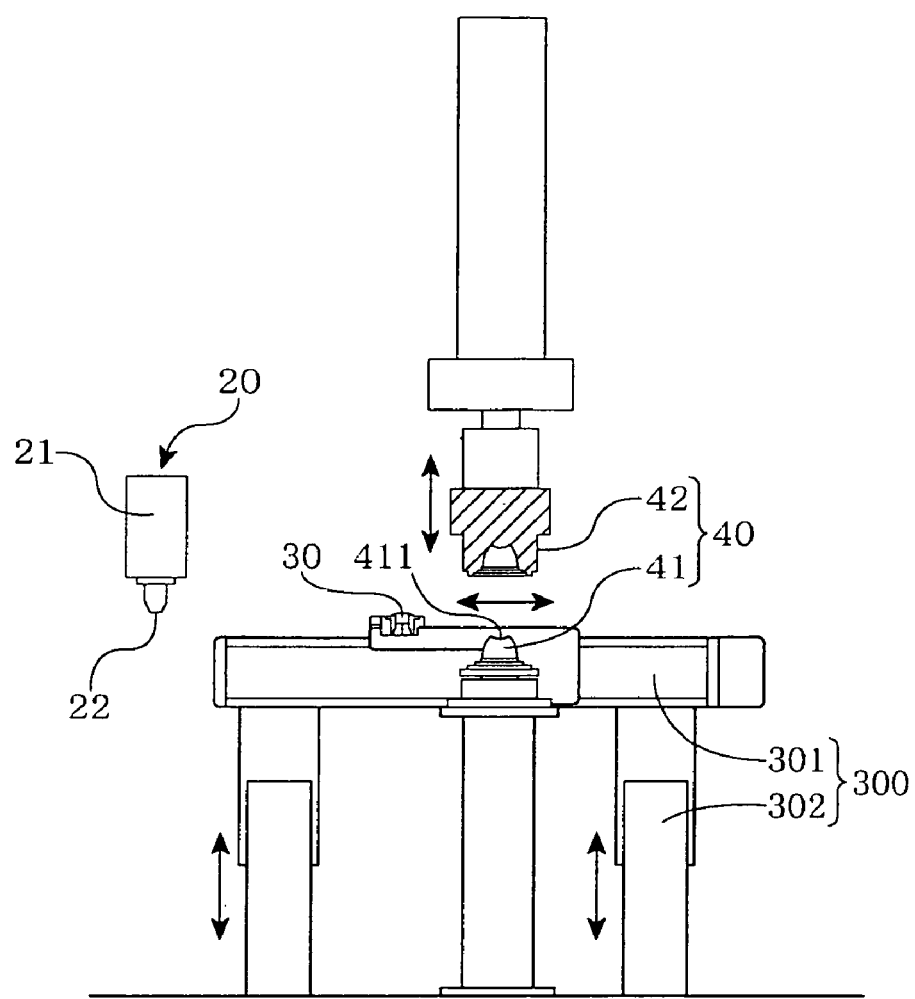
FIG. 3 is a side view of essential parts showing an embodiment of a molten resin compression molding apparatus according to the invention.

FIG. 1 is a plan view showing an outline of an embodiment of a molten resin compression molding apparatus according to the invention. FIG. 2 is an enlarged view of the essential parts thereof. FIG. 3 is a side view of the essential parts shown in FIG. 2 as viewed from the direction indicated by an arrow X in FIG. 2.

The molding apparatus 10 shown in these figures is provided with an extruder 20 which melts and kneads a thermoplastic resin and then extrudes the resin from an extrusion port 22, a plurality of supply means 30 which are arranged around the extrusion port 22 of the extruder 20, and a plurality of compression molding die 40 which are formed in a pair with each of the supply means 30.

FIG. 2 and FIG. 3 each show the essential parts of the molding apparatus 10, noting one of the plurality of supply means 30 arranged around the extrusion port 22 of the extruder 20. One which is obtained by removing the compression molding die 40 from the molding apparatus 10 shown in the figure corresponds to the embodiment of the molten resin supply apparatus according to the invention. The molten resin supply method and the molten resin compression molding method according to the invention can be conducted by preferably utilizing these apparatuses.

The extruder 20 may be provided such that the extrusion port 22 opening at the die head 21 thereof can extrude a molten resin almost downwardly and vertically along the vertical direction. The extruder 20 can be arbitrarily selected from known extruders such as a uni-axial screw extruder, a multi-axial screw extruder, and a gear-pump-assisted extruder.

As the thermoplastic resin which is extruded from the extrusion port 22 after melting and kneading by the extruder 20, an arbitral resin can be used as long as it can be subjected to compression molding. Specific examples thereof include polyester-based resins such as polyethylene terephthalate and polybutylene naphthalate and polyethylene naphthalate, polyolefin-based resins such as polypropylene and polyethylene, polycarbonate, polyacrylate, polylactic acid or a copolymer thereof.

In the shown example, each of the supply means 30 provided around the extrusion port 22 from which a molten resin is extruded is installed on each of a plurality of driving mechanisms 300 arranged in a radial manner around the extrusion port 22, and is allowed to move reciprocally between the lower position of the extrusion port 22 and the supply position provided at each of the supply means 30. At the supply position provided for each supply means 30, the compression molding die 40 which pairs up with each of the supply means 30 is provided.

Figure 4:
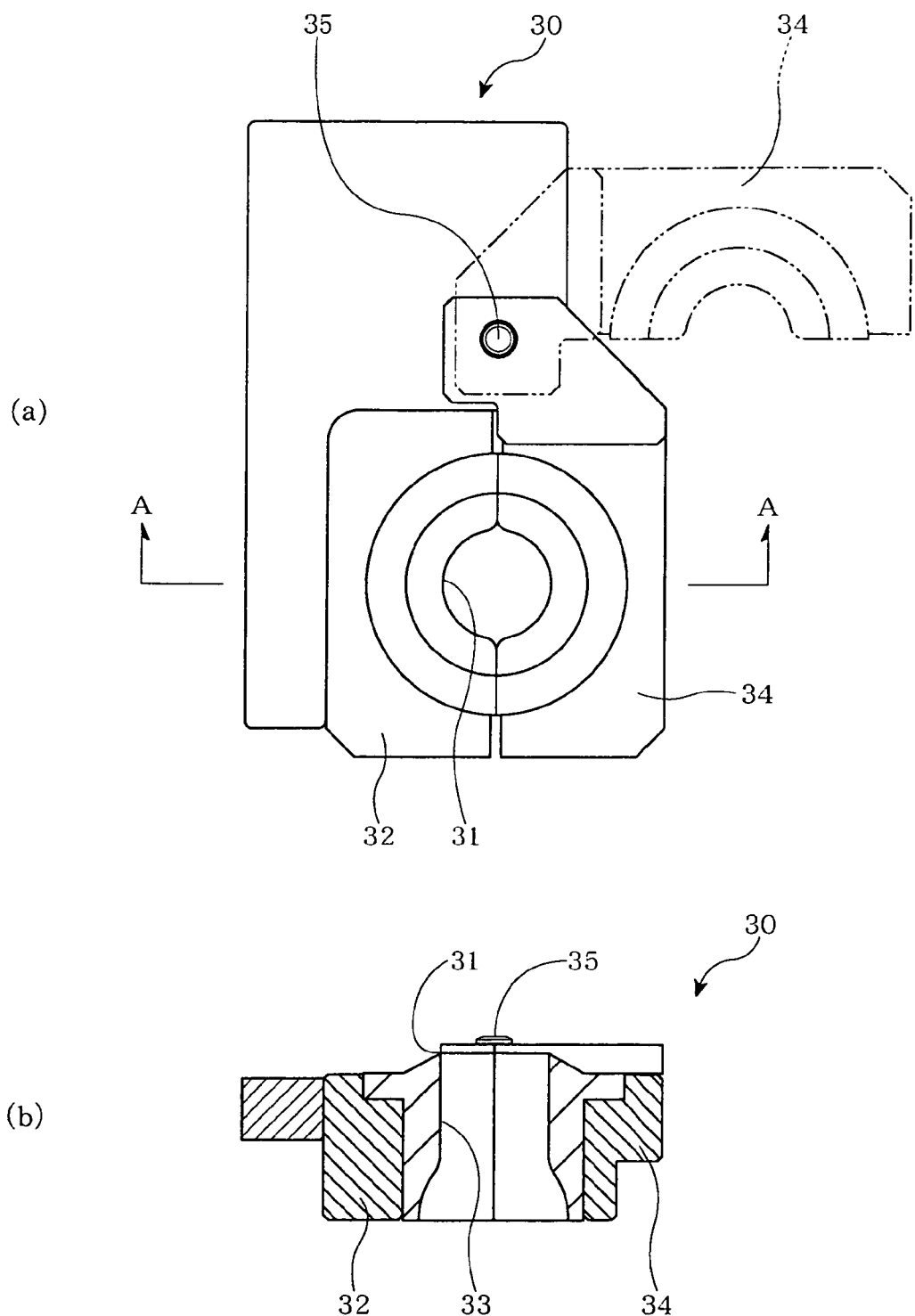
FIG. 4 is an explanatory view showing an outline of supply means.
Figure 5:
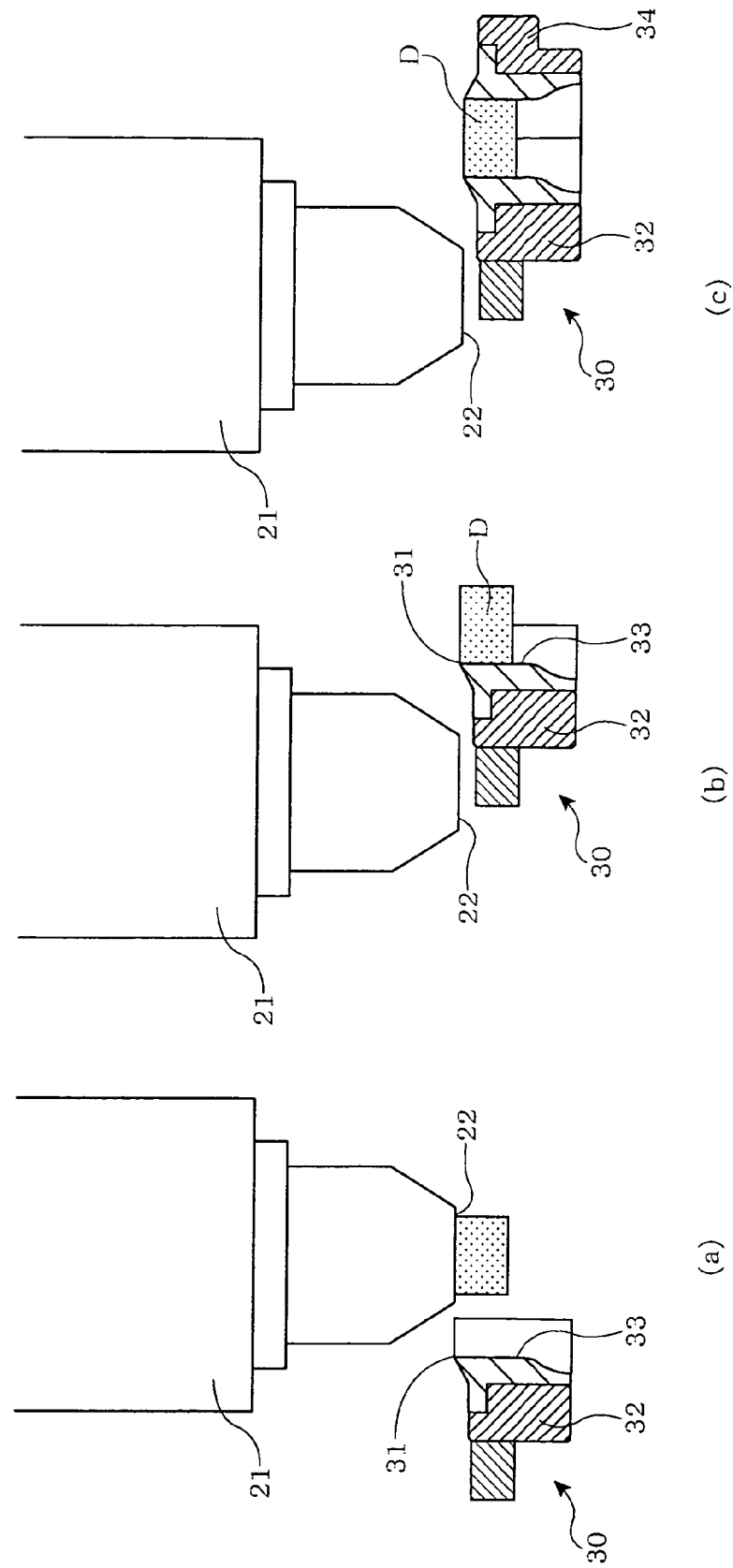
FIG. 5 is an explanatory view explaining the state before and after the supply means pass the lower position of an extrusion port.

Moreover, as is apparent from an example shown in FIGS. 4 and 5, the supply means 30 has a cutting part 31 which cuts, as if it shaves, a molten resin extruded from the extrusion port 22 when the supply means 30 passes through the lower position of the extrusion port 22 towards the compression molding die 40 provided at the supply position. This cutting part 31 is formed along the peripheral edge located above the base 32, and is configured such that the inner surface of the base 32 abuts, as a supporting surface 33, the side of a molten resin D which has been cut by means of the cutting part 31 (see FIG. 5(b)).

Here, FIG. 4 is an explanatory view showing the outline of the supply means 30, in which FIG. 4(a) is the plan view and FIG. 4(b) is a cross-sectional view taken along line A-A in FIG. 4(a). FIG. 5 is an explanatory view showing the state before and after the supply means 30 passes the lower position of the extrusion port 22 of the extruder 20.

A supporting member 34 is openably and closably provided at the supporting base 32 of the supply means 30 such that it is opposed to the supporting surface 33. The supporting member 34 is configured such that it opens and closes around the rotary axis 35 by means of a rotary actuator which is not shown, for example. Such supporting member 34 is in the opened state when the supply means 30 passes the lower position of the extrusion port 22 so that the it does not prevent the cutting of a molten resin by means of the cutting part 31 (see FIGS. 5(a) and 5(b)), and is closed after the molten resin is cut (see FIG. 5(c)).

Here, in FIG. 4, the state in which the supporting member 34 is closed is indicated by a solid line, and the supporting member 34 in the opened state is indicated by a double-dashed line. The supporting member 34 is not shown in FIGS. 5(a) and 5(b).

Opening and closing operation of the supporting member 34 is not limited to the rotation around the rotation axis 35. Although not shown, for example, the opening and closing may be conducted by allowing the supporting member 34 to move in parallel.

When the supporting member 34 is closed, a column-like space is formed between the supporting surface 33 and the supporting member 34. The molten resin D which has been cut is supported in this space. At this time, it is preferred that the molten resin D which has been cut be carried while supporting it in the supporting surface 33 provided in the base 32 by utilizing the inertia force during the movement of the supply means 30. In this case, the inner diameter of the column-like space formed between the supporting surface 33 and the supporting member 34 is designed such that it is slightly larger than the outer diameter of the extrusion port 22, that is, the outer diameter of the molten resin extruded from the extrusion port 22.

In this way, an excessive load is prevented from imposing on the molten resin D which has been cut, whereby deformation thereof can be effectively avoided. At the same time, when the supply means 30 stops at the supply position, the molten resin D drops due to its self weight, whereby the molten resin D can be supplied to the molding die 40.

The supply means 30 was explained hereinabove with reference to one example. The specific examples thereof are not limited to the example mentioned above. The supply means 30 may have a configuration in which each of supply means 30 arranged around the extrusion port 22 of the extruder 20 supplies, while cutting a molten resin which has been extruded from the extrusion port 22 of the extruder 20 alternately in a predetermined length, the molten resin D which has been cut to the supply positions which is provided at each of the supply means, and then sequentially supplies the molten resin D to each of the compression molding dies 40 which are provided in a pair with each of the supply means.

Here, the length of the molten resin to be extruded from the extrusion port 22 can be arbitrarily set according to the amount of a resin necessary for molding by adjusting the speed of extrusion of the extruder 20, or the timing at which the molten resin is alternately cut by each supply means 30, or the like. It is preferred that each supply means 30 be configured equally including the driving mechanism 300 so that the cutting of the molten resin extruded from the extrusion port 22 and the supply of the molten resin D which has been cut are conducted under the same conditions. In particular, in order to facilitate the adjustment of the timing of cutting the molten resin which is extruded from the extrusion port 22 by allowing the moving distance of each supply means 30 to be equal, it is preferred that the supply position provided for each supply means 2030, that is, all of the compression molding dies 40 provided in a pair with each of the supply means 30, be on the same circumference with the extrusion port 22 of the extruder 20 being the center thereof.

The specific configuration of the driving mechanism 300 which carries the supply means 30 is arbitral as long as the cutting of the molten resin by the supply means 30 and the supply of the molten resin D which has been cut are not impaired.

For example, as shown in the figure, the driving mechanism 300 may be a combination of an actuator 301 for horizontal driving which allows the supply means 30 to move reciprocally in the horizontal direction and an actuator 302 for vertical driving for moving them up and down in the vertical direction. The actuator 302 allows, prior to the cutting of the molten resin which has been extruded from the extrusion port 22, while avoiding the collision with other supply means 30 which moves with a time lag, the supply means 30 to move up and down together with the actuator 301 for horizontal driving when it causes the supply means 30 to pass over the extrusion port 22 and turn around to the upper side of the moving direction of the actuator 301 for horizontal driving. The details of the specific operation will be explained later.

As for the supply means 30, when it moves reciprocally between the lower position of the extrusion port 22 and the compression molding die 40 (supply position) by the actuator 301 for horizontal driving, for the sake of convenience, the direction it moves towards the compression molding die 40 is taken as the outward travel direction and the direction it moves away from the compression molding die 40 is taken as the return travel direction, and, in such moving direction, the side nearer to the extrusion port 22 is taken as the upper side and the side nearer to the compression molding die 40 is taken as the lower side.

In the shown example, the compression molding die 40 has a male die 41 as a lower die and a female die 42 as an upper die, and a concave-like receiving part 411 is formed on the upper surface of the male die 41. The size and shape of the receiving part 411 formed on the upper surface of the male die 41 can be designed taken into consideration the shape of a product to be molded according to the size and shape of the molten resin D to be supplied.

In this way, when the molten resin D is dropped to the male die 41 and is supplied by receiving the molten resin D by the receiving part 411, the accuracy of its supply position can be enhanced. Further, by causing the female die 42 to move up and down relative to the male die 41 by fixing the male die 41 during the period of time when the female die 42 is moved downwardly to attain mold clamping, the positional shift of the molten resin D supplied to the male die 41 can be prevented more surely.

In the shown example, the die has a structure which allows the molten resin D thus supplied to be compression-molded into a thin-wall, cup-like container. However, it is needless to say that the specific die structure of the compression molding die 40 can be appropriately changed according to the shape of a molded product, etc.

As mentioned above, in this embodiment, no mechanism for moving the compression molding die 40 is necessary since the compression molding die 40 is provided at the supply position provided for each supply means 30. Therefore, even in a case where a further higher load is needed in compression molding and even in a case where the improvement in performance of the pressurization mechanism for mold clamping and ensuring the strength required therefor are required, its influence is not exerted on other parts than the compression molding die 40. Therefore, this can be preferably utilized also for the production of a synthetic resin molded product which requires a higher load without disadvantages that the entire apparatus is increased in size or the production cost is increased.

Furthermore, not only the molten resin D which has been cut can be supplied to the compression molding die 40 with a sufficient degree of accuracy, but also, since the compression molding die 40 is fixed at the predetermined supply position, the positional accuracy of the molten resin D can be prevented from being impaired even after the molten resin D is supplied to the compression molding die 40. In particular, as mentioned above, the positional shift of the molten resin D can be prevented more surely by fixing the male die 41 which receives the molten resin D to be supplied.

Synthetic Resin Container Production Method

Next, the embodiment of the synthetic resin container production method according to the invention will be explained.

The synthetic resin production method according to the invention can be preferably conducted by utilizing the molding apparatus 10 as mentioned above. The embodiment of the synthetic resin production method according to the invention will be explained by describing below the operation of the molding apparatus 10.

Figure 6:
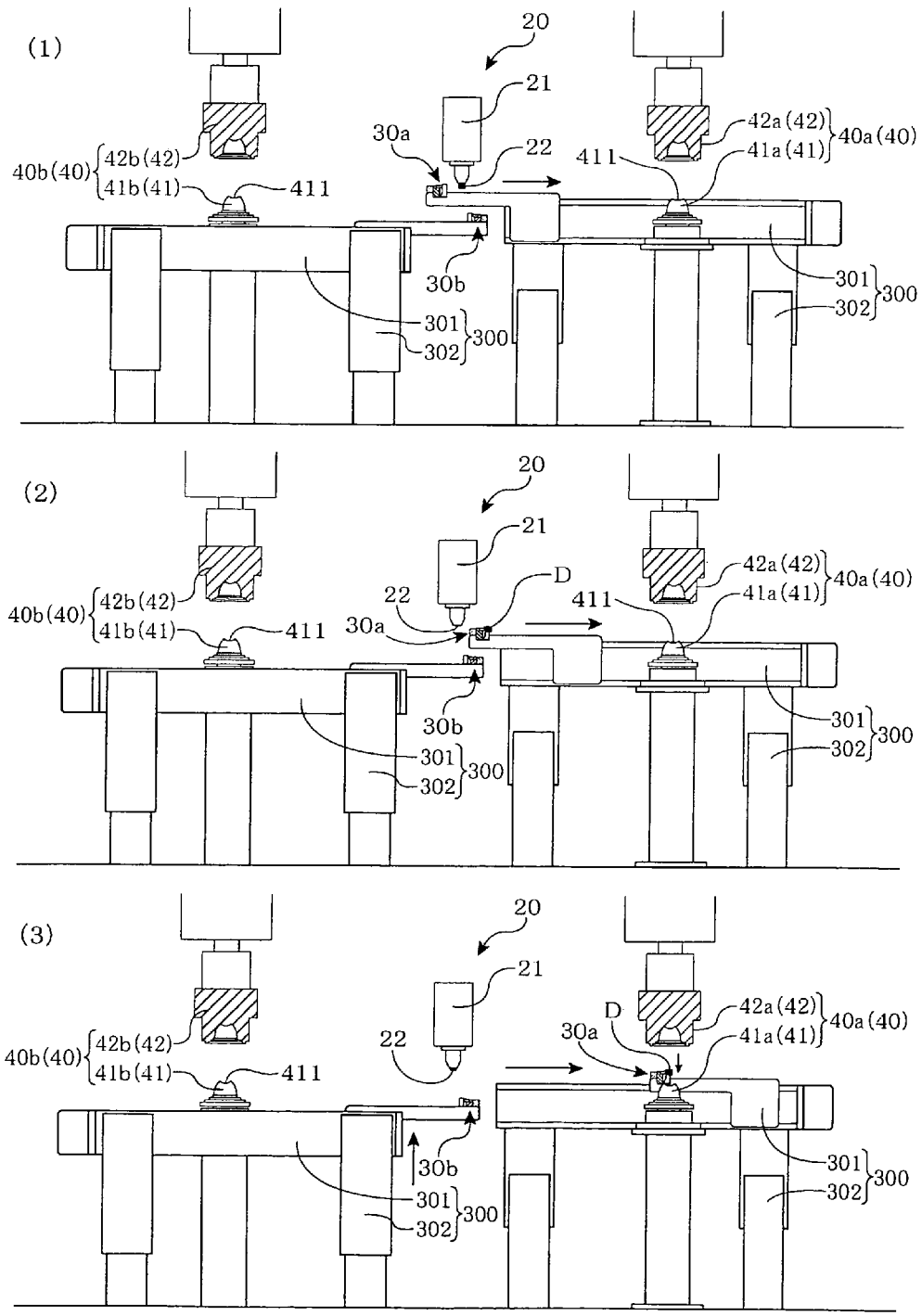
FIG. 6 is a view showing the steps explaining the operation of an embodiment of a molten resin compression apparatus according to the invention.
Figure 7:
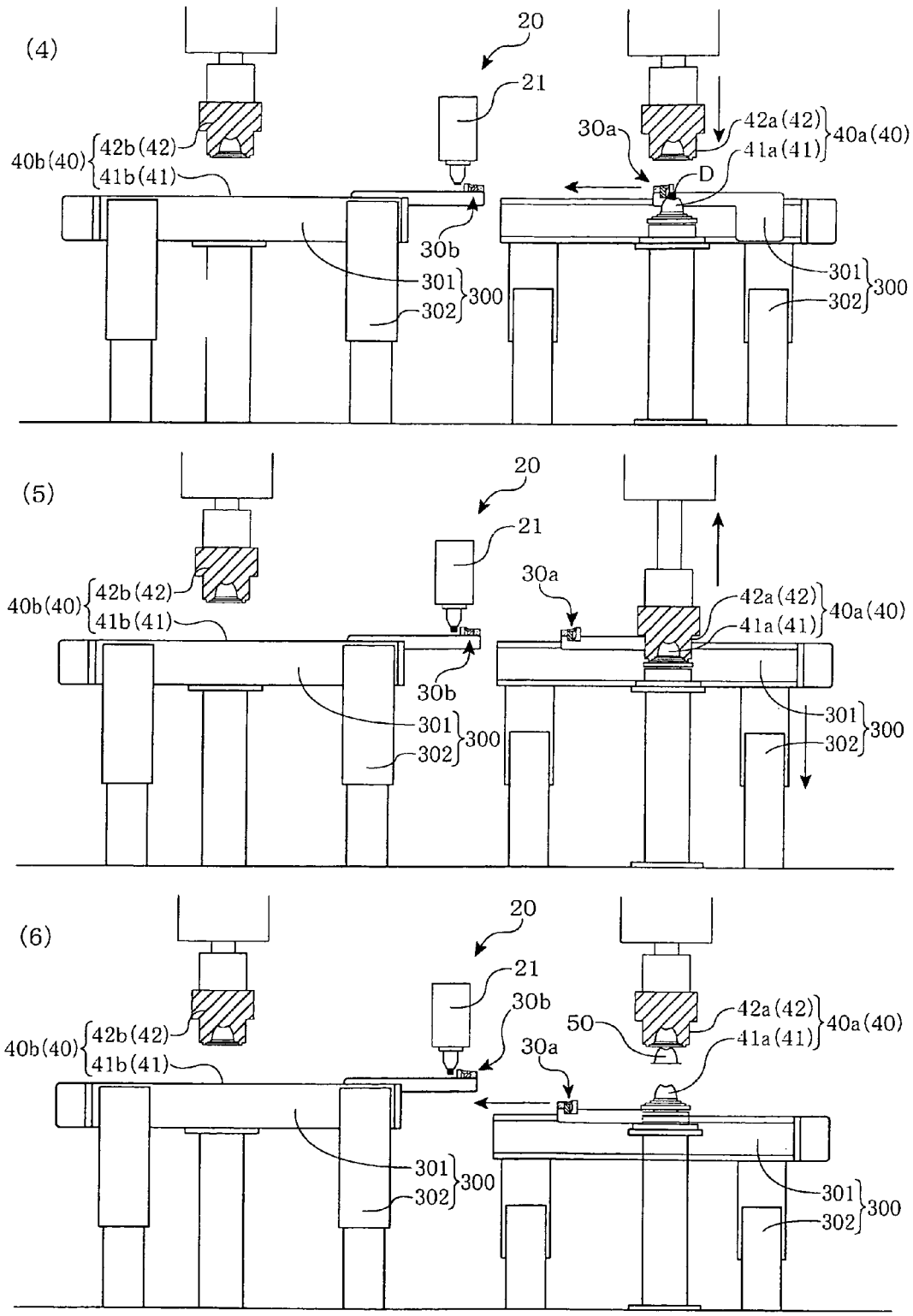
FIG. 7 is a view showing the steps explaining the operation of an embodiment of the molten resin compression molding apparatus according to the invention.

FIGS. 6 and 7 are each a view showing the steps for explaining the operation of the molding apparatus 10. In these figures, an example in which two supply means 30a and 30b and two compression molding dies 40a and 40b which are provided respectively in a pair with the supply means are arranged around the extrusion port 22 of the extruder 20. Moreover, FIG. 6 shows a process during which the supply means 30a cuts a molten resin extruded from the extrusion port 22 of the extruder 20 and conveys it to the supply position at which the compression molding die 40 is provided. FIG. 7 shows a process during which, after the molten resin D is supplied to the compression molding die 40, the supply means 30a starts to move towards a stand-by position at the lower part of the other supply means 30b.

In producing a synthetic resin container by using the molding apparatus 10, as shown in FIG. 6(1), one of the supply means 30a is ready for cutting the molten resin which has been extruded from the extrusion port 22 of the extruder 20 at the position which is over the extrusion port 22 and turns around to the upper side of the moving direction thereof. At the same time, other supply means 30b is in the stand-by state at the lower part of the supply means 30a.

When the molten resin which has been extruded out from the extrusion port 22 has a predetermined length, the supply means 30a is moved in the direction shown by an arrow in the figure by the actuator 301 for horizontal driving. At this time, the supply means 30a which pass through the lower position of the extrusion port 22 cuts the molten resin extruded out from the extrusion port 22, and retains the molten resin D which has been cut by using the inertia force caused by the movement of the supply means 30a (see FIG. 6(2)).

In addition, when the cutting of the molten resin is finished, the supporting member 34 is closed, and the molten resin D which has been cut is retained in a space formed between the supporting member 34 and the supporting surface 33, as mentioned above. The supporting member 34 is not shown in FIGS. 6 and 7.

The molten resin D which is retained by the supply means 30a drops to the male die 41a of the compression molding die 40a when the supply means 30 stops at the supply position at which the compression molding die 40 is installed, whereby the supply thereof is completed (see FIG. 6(3)). At this time, the other supply means 30b elevates by the actuator 302 for vertical driving, and prepares for the cutting of the molten resin extruded from the extrusion port 22.

At this time, the timing at which the other supply means 30b is caused to rise is arbitral, as long as the collision with one of the supply means 30a can be avoided. The supply means 30b may rise immediately after the supply means 30a passes through the lower position of the extrusion port 22.

When the molten resin D is supplied to the male die 41a of the compression molding die 40a, as shown in FIG. 7(4), the supply means 30a is retracted in the direction shown by an arrow in the figure by means of the actuator 301 for horizontal driving, and the male die 42a of the compression molding die 40 moves downwardly (see FIG. 7(5)). As a result, the molten resin D is compression-molded into a synthetic resin container 50 with a predetermined container shape in a cavity formed of a pair of the dies 41a and 42a.

As shown in FIG. 7(6), after finishing compression molding, the female die 42a of the compression molding die 40a moves upwardly, and takes out the synthetic resin container 50 which has been molded. The supply means 30a which has been retracted so that it does not contact the female die 42a moving downwardly, after or simultaneously with the retraction, is lowered by the actuator 302 for vertical driving. Subsequently, by the actuator 301 for horizontal driving, the supply means 30a moves in the direction shown by an arrow in the figure, and turns around to the upper side of its moving direction over the extrusion port 22 and is in the stand-by state below the other supply means 30b.

Thereafter, the supply means 30a and the supply means 30b are exchanged, and the supply means 30b then operates like the above-mentioned supply means 30a, and cuts the molten resin extruded from the extrusion port 22 and supplies the molten resin to the compression molding die 40b, whereby the compression molding die 40a and the compression molding die 40b alternately repeat compression molding of a synthetic resin container.

In this way, according to this embodiment, mass production of the synthetic resin container 50 can be stably conducted continuously.

Hereinabove, an explanation was made taking as an example in which compression molding is alternately conducted by the molding apparatus 10 which is provided with, around the extrusion port 22 of the extruder 20, the two supply means 30a and 30b and the two compression molding dies 40a and 40b installed such that they are in pair with these supply means. The same explanation can be made on a case where the supply means 30 and the compression molding dies 40 which pair up with the supply means 30 are arranged in a number of three or more. That is, even if the number of the supply means 30 and the compression molding die 40 which pair up with the supply means 30 is increased to three or more, by allowing all of the supply means 30 to conduct the same operation as that of the above-mentioned supply means 30a with a time lag, compression molding can be conducted alternately in each of compression molding dies 40.

As the synthetic resin container 50 to be produced in this embodiment, a thin-wall, cup-like container, which requires a relatively high load during compression molding, is preferable. In particular, this embodiment is suitable for producing a thin-wall, cup-like container having a multilayer structure. In order to allow the synthetic resin container 50 to have a multilayer structure, the internal structure of the die head 21 of the extruder 20 may be one shown in FIG. 8.

Figure 8:
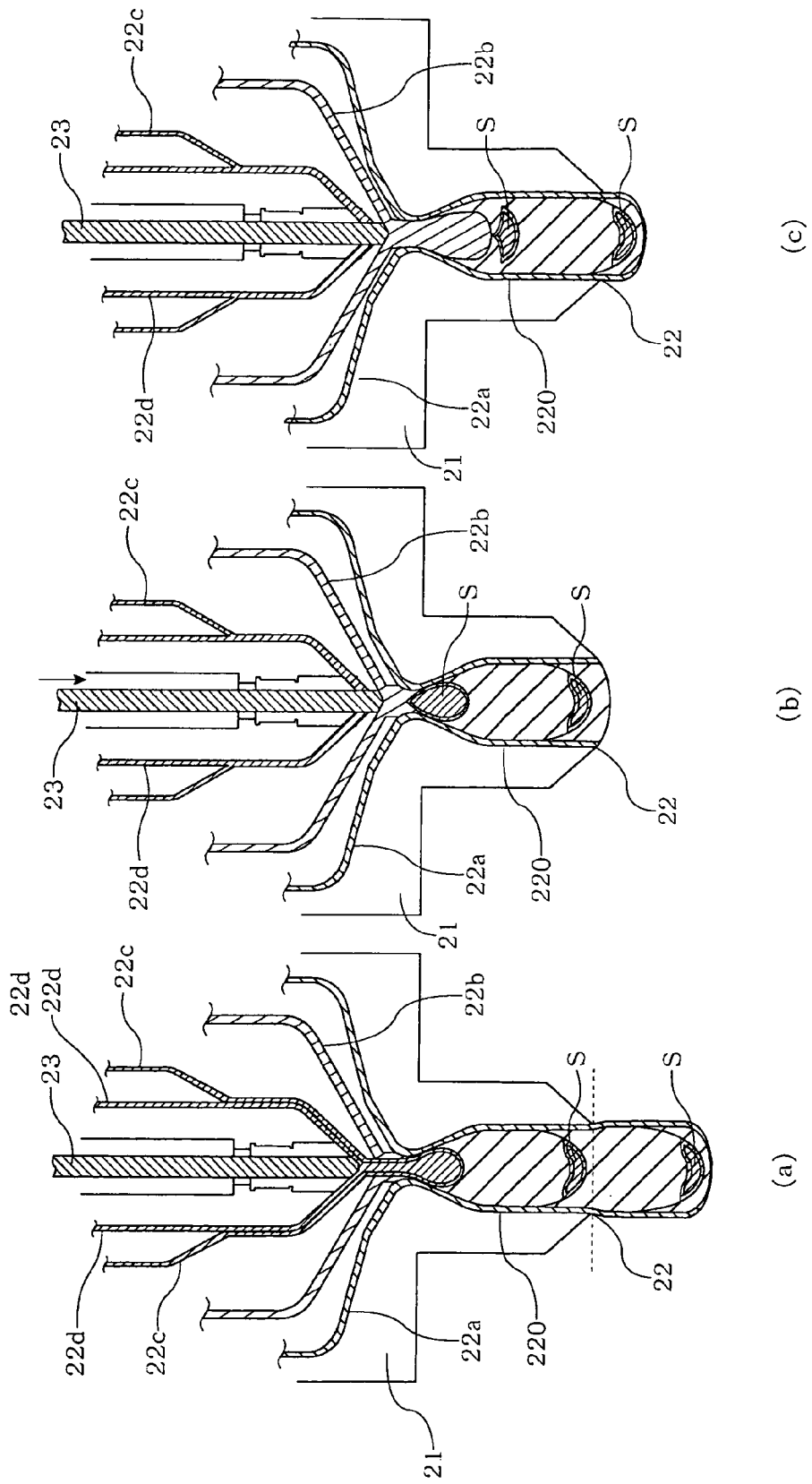
FIG. 8 is an explanatory view for explaining one example of a die head for allowing a synthetic resin container to have a multilayer structure.

In the example shown in FIG. 8, in the die head 21, the discharge flow channel 220 which continues to the extrusion port 22 and the four cyclic flow channels 22a, 22b, 22c and 22d arranged concentrically around the extrusion port 22 which serve to allow the molten resin which has been sent to each flow channel to flow to the discharge flow channel 220 are formed. For the sake of convenience, the four cyclic flow channels 22a, 22b, 22c and 22d arranged concentrically around the extrusion port 22 are referred to as the first cyclic flow channel 22a, the second cyclic flow channel 22b, the third cyclic flow channel 22c and the fourth cyclic flow channel 22d as counted from the peripheral side.

The first cyclic flow channel 22a and the second cyclic flow channel 22b are separately crossed with the discharge flow channel 220, and the molten resin which has been sent to the second cyclic flow channel 22b flows into the discharge flow channel 220 on the upper stream side than the molten resin which has been sent to the first cyclic flow channel 22a.

On the other hand, the third cyclic flow channel 22c joins the fourth cyclic channel 22d on its way to the discharge flow channel 220, and the molten resin which has been sent to the third cyclic flow channel 22c is allowed to flow into the discharge flow channel 220 together with the molten resin which has been sent to the fourth cyclic flow channel 22d. The flow position at this time is on the upper stream side than the position at which the molten resin which has been sent to the second cyclic flow channel 22b flows into the discharge flow channel 220. The molten resin which has been sent to the third cyclic flow channel 22c and the molten resin which has been sent to the fourth cyclic flow channel 22d intermittently flow into the discharge flow channel 220 by opening and closing the valve 23 as shown in the figure.

Here, FIG. 8(a) shows the state immediately before the cutting of the molten resin which has been extruded from the extrusion port 22, and the part which is to be cut is shown by a chain line in the figure. At this time, in the process shown in the figure, the valve 23 is in the open state, and the molten resin which has been sent to the third cyclic flow channel 22c and the molten resin which has been sent to the fourth cyclic flow channel 22d flow into the discharge flow channel 220, and during the process in which they flow down the discharge flow channel 220, they sequentially join the molten resin which has been sent to the second cyclic flow channel 22b and the molten resin which has been sent to the first cyclic flow channel 22a.

Subsequently, as shown in FIG. 8(b), the valve 23 is closed, thereby to intercept the inflow to the discharge flow channel 220 of the molten resin which has been sent to the third cyclic flow channel 22c and the molten resin which has been sent to the fourth cyclic channel 22d. As a result, the resins which have previously been flown into the discharge flow channel 220 are separated, whereby a shell body S is formed. The shell body S flows down the inside of the discharge flow channel 220 while being pushed to become flat by the molten resin which flows into the discharge flow channel 220 from the second cyclic channel 22b (see FIG. 8(c)).

In forming the shell body S in the molten resin which has been extruded from the extrusion port 22 as mentioned above, the interval at which the shell body S is formed, and the shape of the shell body S included in molten resin D which has been cut can be controlled by suitably adjusting the timing of opening and closing the valve 23, the flow velocity of the molten resin sent to each of the cyclic flow channels 22a, 22b, 22c and 22d, etc.

Figure 9:
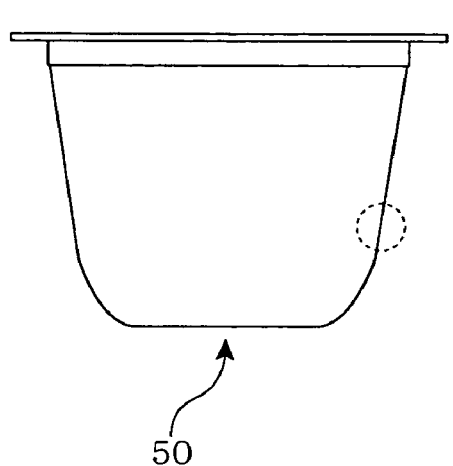
FIG. 9 is an explanatory view showing an example of a synthetic resin container.
Figure 9:
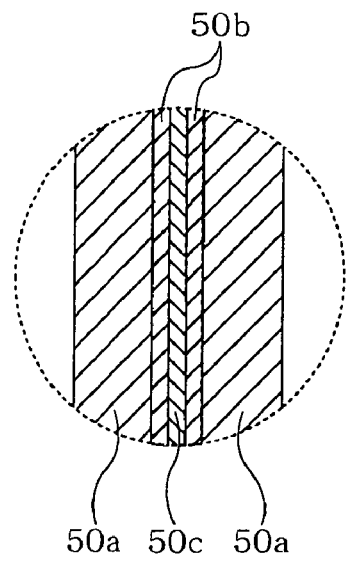

A thin-wall, cup-like container 50 with a multilayer structure as shown in FIG. 9, for example, can be molded by forming the shell body S in the molten resin which has been extruded from the extrusion port 22 as mentioned above, cutting such molten resin, and supplying the resin to the compression molding die 40. That is, the molten resin D which has been supplied to the compression molding die 40 is extended within the cavity formed by a pair of dies 41 and 42, and at this time, an intermediate layer 50b and an inner layer 50c are formed by the shell body S, whereby the resin is molded into a thin-wall, cup-like container 50 with a multilayer structure.

Here, FIG. 9 shows an example of the thin-wall, cup-like container 50 with a multilayer structure molded in this embodiment, and the section of a part enclosed by the chain line in FIG. 9(a) is shown in 9(b). When molding such thin-wall, cup-like container 50 with a multilayer structure by the internal structure of the die head 21 having the above-mentioned structure, the same kind of a resin is usually used for the molten resin which has been sent to the first cyclic flow channel 22a and for the molten resin which has been sent to the second cyclic flow channel 22b, and the outer layer 50a is formed with these resins. By the molten resin which has been sent to the third cyclic flow channel 22c and the molten resin which has been sent to the fourth cyclic flow channel 22d which form the shell body S, the intermediate layer 50b and the inner layer 50c are respectively formed.

At this time, if the molten resin D cannot be supplied with a sufficient accuracy to the compression molding die 40, and the positional accuracy the molten resin D is impaired after the supply, the shell body S forming the intermediate layer 50b and the inner layer 50c do not spread in the entire container and overflows the container to come up the surface thereof or the like, whereby formation of the intermediate layer 50b and the inner layer 50c are interfered.

On the other hand, according to this embodiment, not only the molten resin D which has been cut can be supplied to the compression molding die 40 with a sufficient accuracy, but also the compression molding die 40 is installed and fixed at the predetermined supply position, after the molten resin D is supplied to the compression molding die 40, the positional accuracy of the molten resin D can be easily prevented from being impaired. Therefore, distribution within the container of the intermediate layer 50b and the inner layer 50c, which are formed by the shell body S, can be uniform. The above is the reason for the fact that the synthetic resin container production method in this embodiment is particularly suited to the production of a thin-wall, cup-like container with a multilayer structure.

The invention was explained hereinabove with reference to the preferred embodiment thereof. However, the invention is not limited to the above-mentioned embodiment, and various modifications are possible as far as the object of the invention is not impaired.

INDUSTRIAL APPLICABILITY

The invention can be utilized preferably for the synthetic resin production by compression molding, in particular for the production of a thin-wall synthetic resin container with a multilayer structure.

The invention claimed is:

1. A molten resin compression molding method, comprising:
    extruding a resin in a molten state from an extrusion port of an extruder downwardly along a vertical direction,
    cutting the molten resin which has been extruded from the extrusion port alternately in a predetermined length by a plurality of supply means which are provided around the extrusion port and reciprocally move between a lower position of the extrusion port and a supply position provided at each of the supply means,
    supplying the molten resin to each of a plurality of compression molding apparatuses provided in a pair with the supply means at the supply position,
    compressing molding the cut molten resin by the compression molding apparatus in a predetermined shape, and
    transporting the cut molten resin from the lower position of the extrusion port to the supply position consecutively by said plurality of supply means to thereby provide the cut molten resin to the respective compression molding apparatuses,
    wherein the plurality of supply means includes a first supply means and a second supply means, and the cutting of the molten resin with the first supply means occurs followed by the cutting of the molten resin with the second supply means, and
    the plurality of compression molding apparatus is radially arranged such that the extrusion port of the extruder is a radial center of the plurality of compression molding apparatus.

2. A synthetic resin container production method, comprising:
    extruding a resin in a molten state from an extrusion port of an extruder downwardly along a vertical direction,
    cutting the molten resin which has been extruded from the extrusion port alternately in a predetermined length by a plurality of supply means which are provided around the extrusion port and reciprocally move between the lower position of the extrusion port and a supply position provided at each of the supply means;
    supplying the molten resin to each of a plurality of compression molding apparatuses provided in a pair with the supply means at the supply position,
    compressing molding the cut molten resin by the compression molding apparatus in a predetermined container shape, and
    transporting the cut molten resin from the lower position of the extrusion port to the supply position consecutively by said plurality of supply means to thereby provide the cut molten resin to the respective compression molding apparatuses,
    wherein the plurality of supply means includes a first supply means and a second supply means, and the cutting of the molten resin with the first supply means occurs followed by the cutting of the molten resin with the second supply means, and
    the plurality of compression molding apparatus is radially arranged such that the extrusion port of the extruder is a radial center of the plurality of compression molding apparatus.

3. The synthetic resin container production method according to claim 2, wherein the plurality of compression molding apparatuses have a compression molding die, and the compression molding die has a male die as a lower die and a female die as an upper die, and, at a time of supplying the cut molten resin to the compression molding die, the cut molten resin is received by a concave-shaped receiving part provided on an upper surface of the male die.

4. The synthetic resin container production method according to claim 2, wherein a cup-like container with a multilayer structure is produced.

5. The molten resin compression molding method according to claim 1, wherein the second supply means moves vertically upward in advance of the cutting of the molten resin with the second supply means occurs.

6. The synthetic resin container production method according to claim 2, wherein the second supply means moves vertically upward in advance of the cutting of the molten resin with the second supply means occurs.

* * * * *